(12) United States Patent
Hamamura

(10) Patent No.: US 11,221,551 B2
(45) Date of Patent: Jan. 11, 2022

(54) LIGHT SOURCE APPARATUS, PROJECTOR, LIGHT SOURCE MODULE, AND ROTATION CONTROL METHOD OF ROTATING BODY

(71) Applicant: NEC Display Solutions, Ltd., Tokyo (JP)

(72) Inventor: Shigeo Hamamura, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 13 days.

(21) Appl. No.: 16/633,539

(22) PCT Filed: Aug. 23, 2017

(86) PCT No.: PCT/JP2017/030168
§ 371 (c)(1),
(2) Date: Jan. 23, 2020

(87) PCT Pub. No.: WO2019/038862
PCT Pub. Date: Feb. 28, 2019

(65) Prior Publication Data
US 2020/0233288 A1    Jul. 23, 2020

(51) Int. Cl.
*G03B 21/20*   (2006.01)
*H04N 9/31*    (2006.01)
*G02B 26/00*   (2006.01)

(52) U.S. Cl.
CPC ......... *G03B 21/204* (2013.01); *G02B 26/008* (2013.01)

(58) Field of Classification Search
CPC .............. G03B 21/204; G03B 21/2013; G03B 21/2033; G03B 21/2046; G03B 21/2053; H04N 9/3155; H04N 9/31258; H04N 9/3161; H04N 9/3164
See application file for complete search history.

(56) References Cited

U.S. PATENT DOCUMENTS

2014/0347634 A1    11/2014   Bommerbach et al.
2017/0289511 A1*   10/2017   Usami ................. H04N 9/3155

FOREIGN PATENT DOCUMENTS

| JP | 2014-160233 A | 9/2014 |
| JP | 2014-164289 A | 9/2014 |
| JP | 2015-022295 A | 2/2015 |
| JP | 2017-142451 A | 8/2017 |
| WO | WO 2015/181913 A1 | 12/2015 |
| WO | WO-2016051537 A1 * | 4/2016 ........... H04N 9/3105 |

OTHER PUBLICATIONS

International Search Report (ISR) (PCT Form PCT/ISA/210), in PCT/JP2017/030168, dated Nov. 28, 2017.

* cited by examiner

*Primary Examiner* — Ryan D Howard (74) *Attorney, Agent, or Firm* — McGinn I.P. Law Group, PLLC.

(57) ABSTRACT

Flicker in a projector using a plurality of phosphor wheels is reduced. The light source device according to the present invention includes a first rotating body and a second rotating body that each include a phosphor; and a rotation body controller that rotates the first rotating body and the second rotating body so that a difference between a maximum value and a minimum value of combined light of first fluorescence obtained by the first rotating body and second fluorescence obtained by the second rotating body becomes smaller.

9 Claims, 11 Drawing Sheets

LIGHT SOURCE APPARATUS, PROJECTOR, LIGHT SOURCE MODULE, AND ROTATION CONTROL METHOD OF ROTATING BODY

TECHNICAL FIELD

The present invention relates to a light source device, a projector, a light source module, and a rotation control method of a rotating body.

BACKGROUND ART

Figure 1:
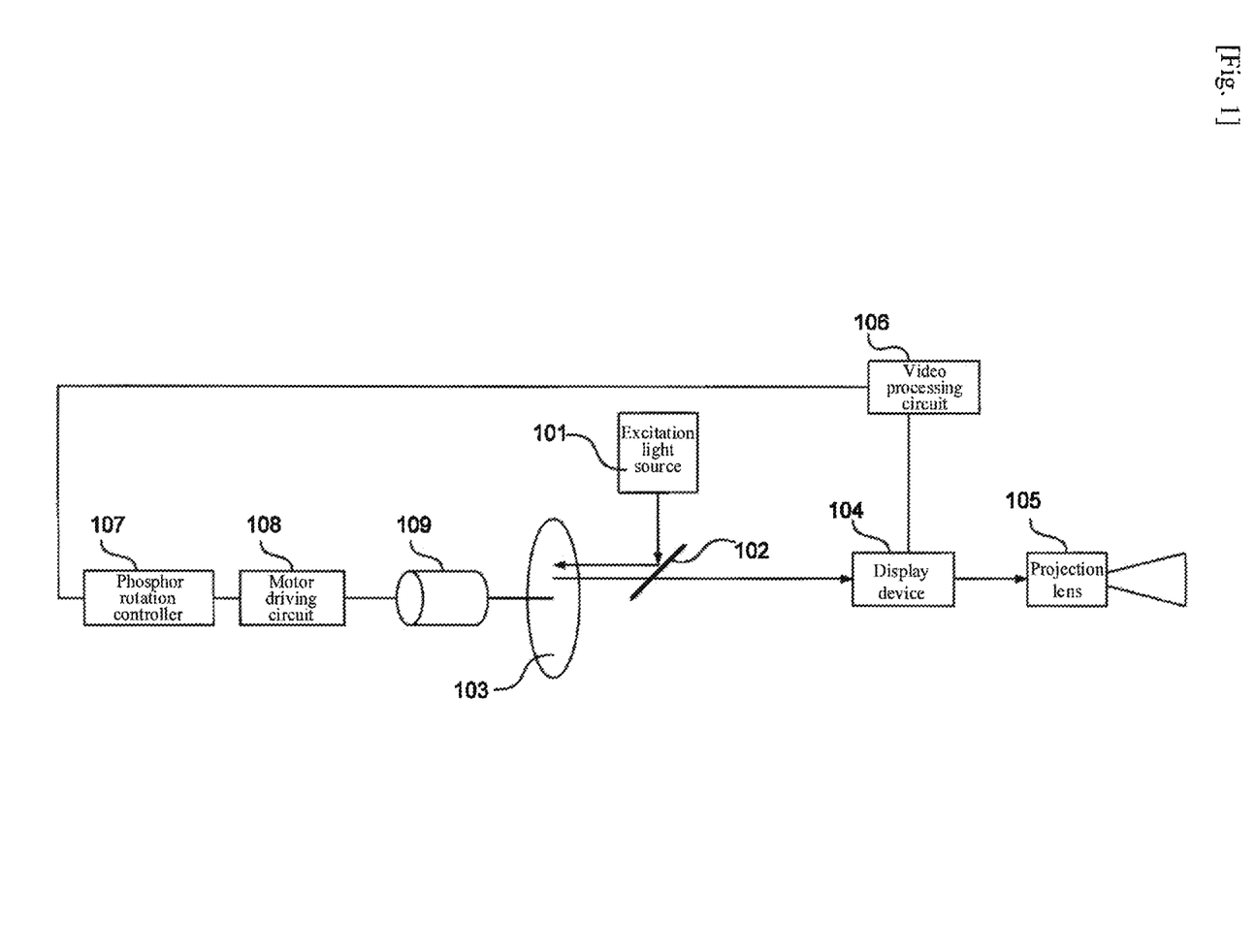
FIG. 1 is a block diagram showing a configuration of a main part of a projector in which a phosphor is used as a part of a light source.

FIG. 1 is a block diagram showing a main configuration of a projector using a phosphor as a part of a light source.

In the projector shown in FIG. 1, excitation light generated by excitation light source 101 is reflected by dichroic mirror 102, and enters phosphor wheel 103 which is a rotating body to excite the phosphor formed on phosphor wheel 103. Fluorescence that is generated by the excited phosphor and whose wavelength is different from the excitation light passes through dichroic mirror 102 to irradiate display device 104. Image light formed by irradiate display device 104 is projected by projection lens 105.

The configuration shown in FIG. 1 is for generating image light of a fluorescent color, for example, green. Actually, image light of each color is generated by using a plurality of configurations shown in FIG. 1. Color image light is projected by projection lens 105.

Video processing circuit 106 sends a video signal to display device 104, and outputs a driving periodic signal indicating the driving cycle of display device 104 to phosphor rotation controller 107. Phosphor rotation controller 107 sets an appropriate rotation speed for motor driving circuit 108 in accordance with the driving periodic signal. Motor driving circuit 108 drives motor 109 to rotate phosphor wheel 103.

Figure 2:
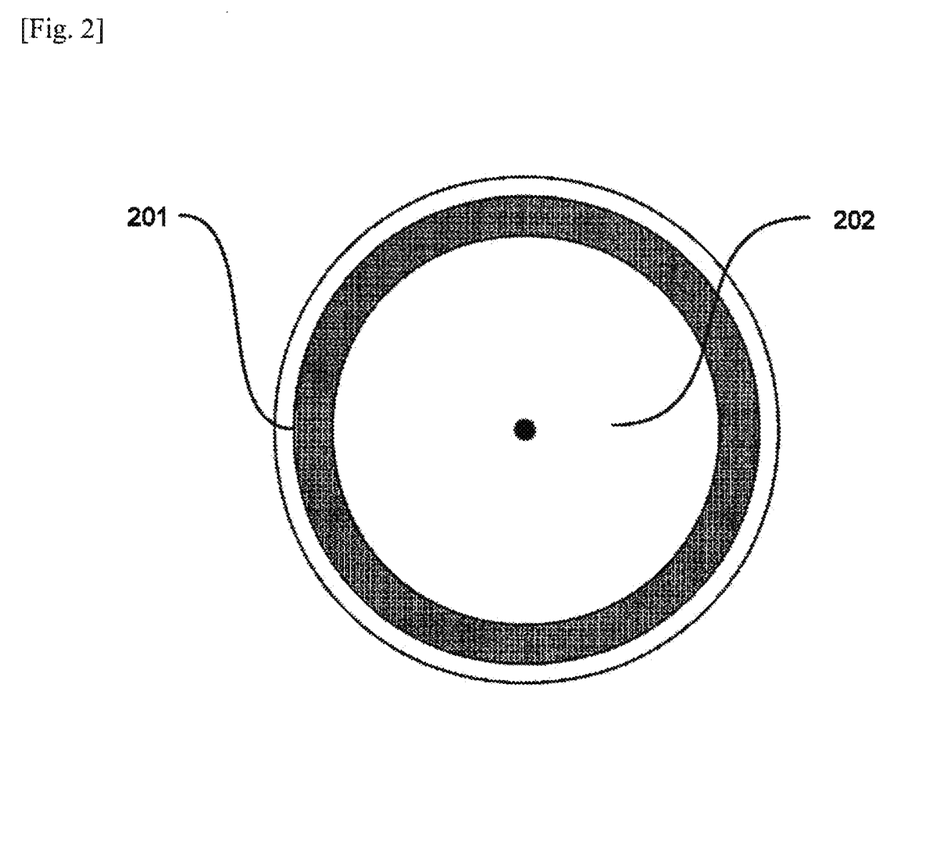
FIG. 2 is a diagram showing a structure of a phosphor wheel.

In the configuration shown in FIG. 1, it is necessary to cool phosphor wheel 103 in order to avoid burning due to heat generation when fluorescence is generated. As shown in FIG. 2, phosphor wheel 103 is configured to prevent the same portion of phosphor 201 from being excited by rotating disk 202 on which phosphor 201 is applied in an annular shape by motor 109; and to efficiently perform light emission and cooling.

Figure 3:
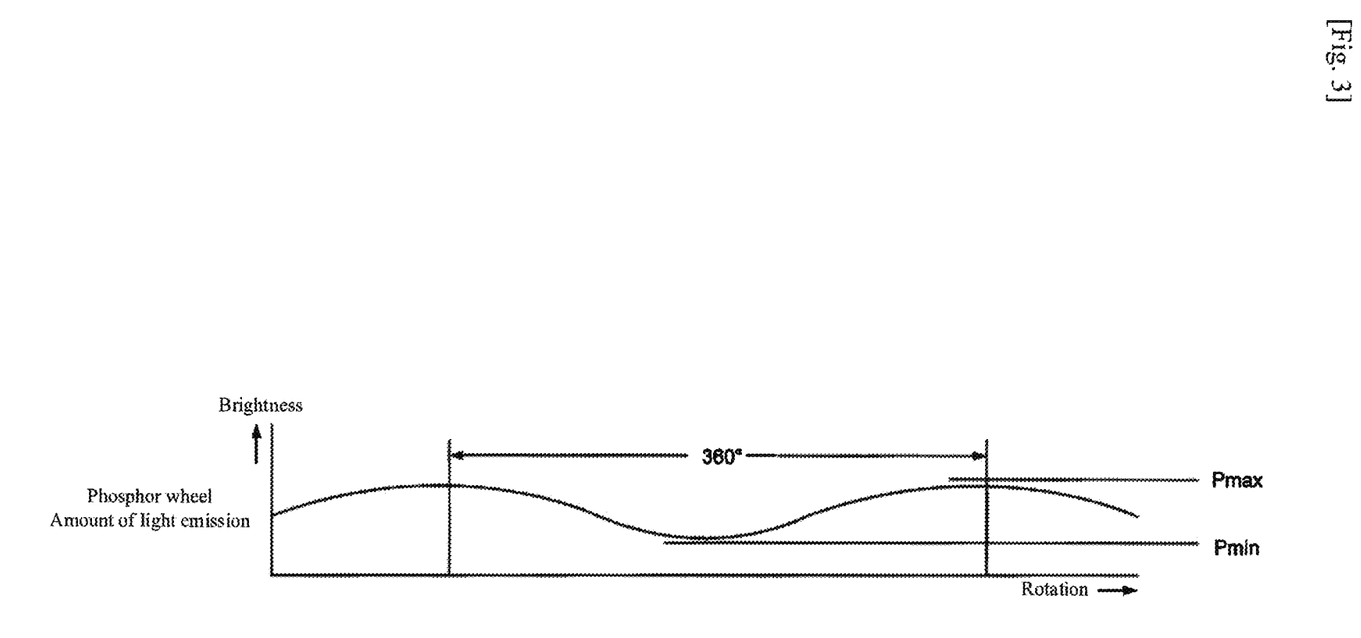
FIG. 3 is a diagram showing a brightness change due to phosphor coating unevenness of the phosphor wheel.

However, since it is difficult to make the coating thickness of phosphor 201 shown in FIG. 2 uniform, more than a small amount of uneven coating occurs. The amount of fluorescence generated by phosphor wheel 103 varies depending on the coating thickness. Therefore, the phosphor wheel having coating unevenness has maximum value Pmax and minimum value Pmin as shown in the graphs of FIG. 3, for example. Due to interference between the period in which the amount of fluorescence changes and the driving cycle of display device 104 of FIG. 1, flicker that can be recognized by the human eye may be caused.

Therefore, the flicker has been reduced by synchronizing the rotational speed of phosphor wheel 103 with the driving cycle of display device 104 or by driving them so that the flicker is recognized by the human eye.

Patent Document 1 (WO2015/181913) discloses a technique for reducing flicker by detecting the rotation of a phosphor wheel and changing the intensity of exciting light according to the detection result and the fluorescence characteristics of the phosphor wheel.

LITERATURE OF THE PRIOR ART

Patent Literature

Patent Document 1: International Publication WO2015/181913

DISCLOSURE OF THE INVENTION

Problems to be Solved by the Invention

In order to realize a projector that projects a brighter image, projectors are configured to use a plurality of phosphor wheels and to synthesize the fluorescence generated by each phosphor wheel. In the case of such a configuration, since a plurality of phosphor wheels which are rotated are used, in addition to interference with the display device, interference between the phosphor wheels also occurs, resulting in a problem in which flicker is increased.

Figure 4:
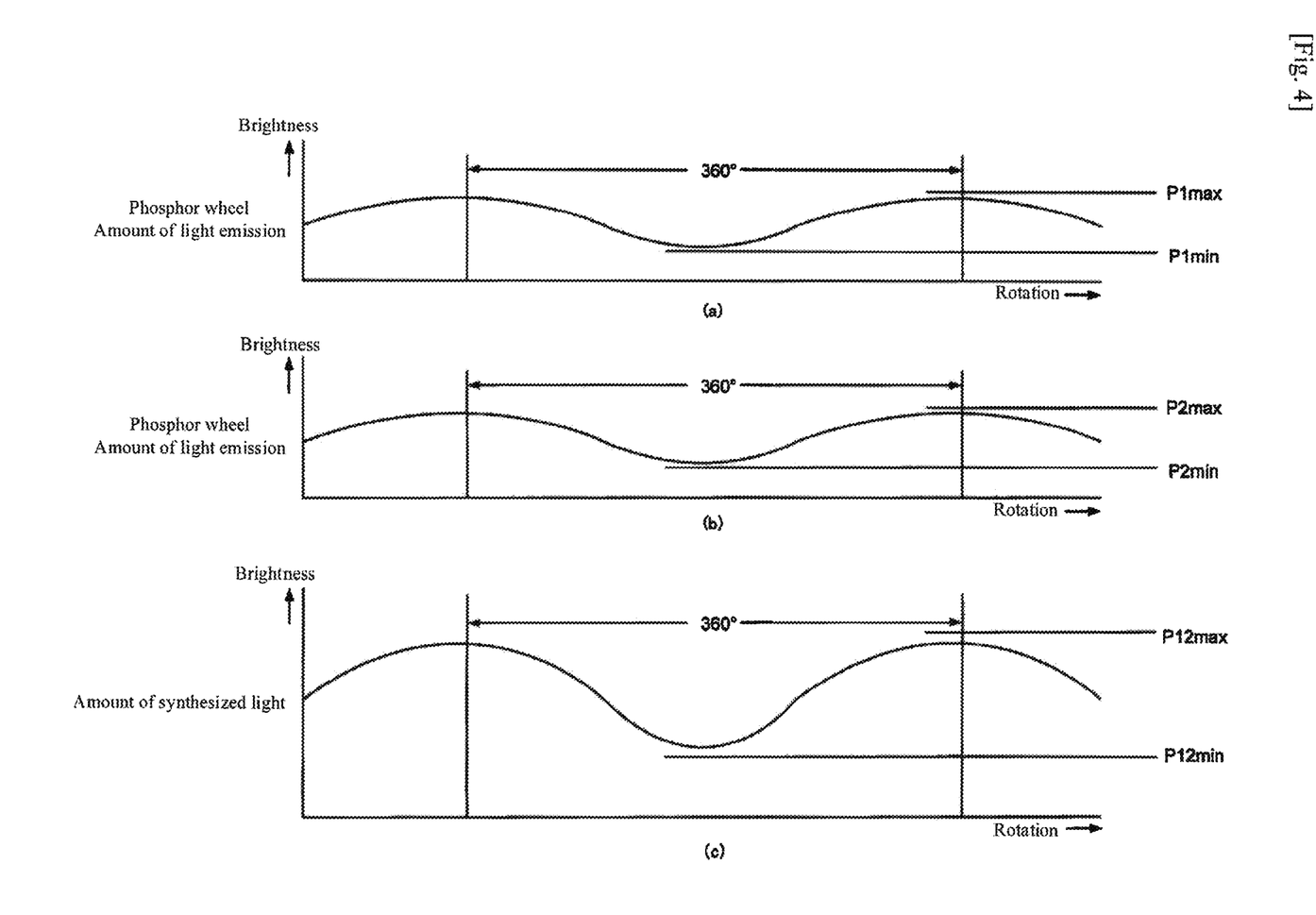

For example, when a projector is configured using two phosphor wheels, it is assumed that phosphor wheels a and b that have the same coating unevenness are used as shown in FIGS. 4(a) and 4(b). When two phosphor wheels a and b are synchronously rotated, if the unevenness of the phosphors of two phosphor wheels a and b coincides, the combined light becomes as shown in FIG. 4(c), and the difference between the maximum value P12max and the minimum value P12min becomes largest. At this time, if the rotational speed of the phosphor wheel is sufficiently high, light from the light source is not recognized as flicker by the human eye, but flicker is generated due to interference with the driving cycle of display device 104 of FIG. 1.

Moreover, when two phosphor wheels a and b are asynchronously rotated, P1max and P2max or P1min and P2min overlap with each other at a constant cycle due to differences in the rotational cycle. In the case where this cycle can be sensed by the human eye, the light source itself causes flicker.

In a projector using a plurality of phosphor wheels of this type, the projected image is brighter than a projector using a single phosphor wheel, and therefore, flicker that occurs is also noticeable. Therefore, there is a need for a technique to reduce flicker more effectively.

The present invention reduces flicker in a projector using a plurality of phosphor wheels.

Means for Solving the Problem

A light source apparatus according to the present invention includes:

a first rotating body and a second rotating body that each include a phosphor; and a rotation body controller that rotates the first rotating body and the second rotating body so that a difference between a maximum value and a minimum value of synthesized light of a first fluorescence obtained by the first rotating body and a second fluorescence obtained by the second rotating body becomes smaller.

A projector according to the present invention includes:

the above-mentioned light source device;

a display device that modulates light emitted from the light source device based on a video signal; and a projection lens that projects light modulated by using the display device.

A light source module according to the present invention includes:

a phosphor wheel;

an index provided on the phosphor wheel;
an index detecting unit that detects the index;
a sensor that detects the amount of fluorescence generated by the phosphor wheel; and
a memory that stores detection results obtained by the sensor when the phosphor wheel is rotated by one rotation.

A method for controlling rotation of a rotating body according to the present invention is a method for controlling rotation of a first rotating body and a second rotating body and includes rotating the first rotating body and the second rotating body so that the difference between the maximum value and the minimum value of combined light of the first fluorescence obtained by the first rotating body and the second fluorescence obtained by the second rotating body becomes smaller.

Effect of Invention

The present invention having the above configuration reduces flicker in a projector that uses a plurality of phosphor wheels.

BRIEF DESCRIPTION OF THE DRAWINGS

FIG. 4 FIGS. 4(a) to 4(c) are diagrams showing a brightness change due to phosphor coating unevenness in the case of using two phosphor wheels.
FIG. 7 FIGS. 7(a) to 7(e) are diagrams showing a light amount measurement method performed by controller 5071 in a first example embodiment of the present invention.
FIG. 8 FIGS. 8(a) to 8 (c) are diagrams for explaining the effect according to the first example embodiment of the present invention.

EXAMPLE EMBODIMENTS

Next, Exemplary embodiments of the present invention are next described with reference to the accompanying drawings.

Example Embodiment 1

Figure 5:
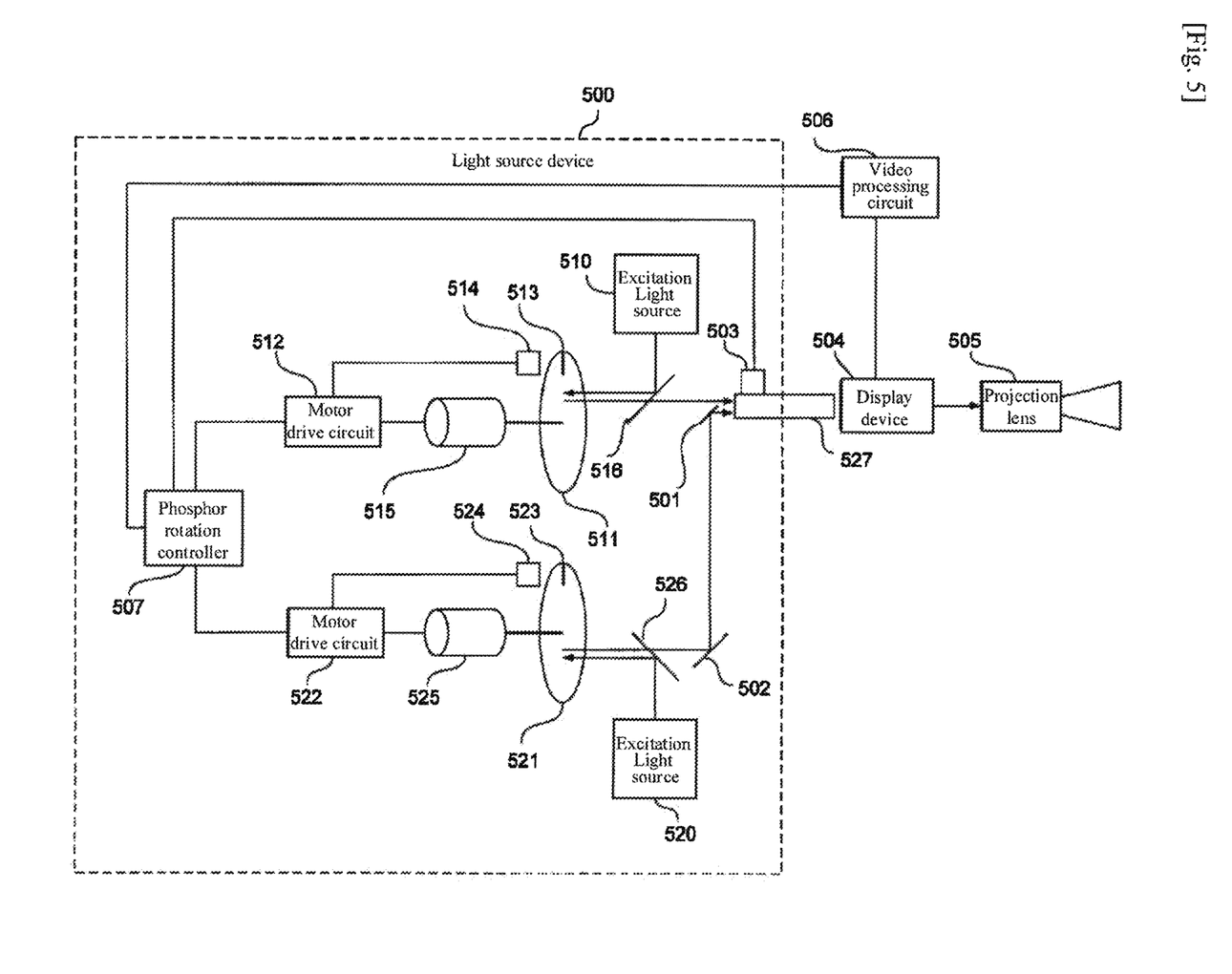
FIG. 5 is a block diagram showing a configuration of an example embodiment of a projector according to the present invention.

FIG. 5 is a block diagram showing a configuration of a main part of an example embodiment of the projector according to the present invention.

In the projector shown in FIG. 1, one excitation light source 101 and one phosphor wheel 103 are respectively provided. On the other hand, in the projector of the present embodiment, two excitation light sources and two phosphor wheels are provided as in excitation light sources 510 and 520 and phosphor wheels 511 and 521, respectively.

In the projector shown in FIG. 5, excitation light generated by excitation light source 510 is reflected by dichroic mirror 516, and enters phosphor wheel 511 to excite the phosphor formed on phosphor wheel 511. Fluorescence that is generated by the excited phosphor and whose wavelength is different from that of the excitation light passes through dichroic mirror 516 to enter light tunnel 527.

Excitation light generated by excitation light source 520 is reflected by dichroic mirror 526 and enters phosphor wheel 521 to excite the phosphor formed on phosphor wheel 521. Fluorescence that is generated by the excited phosphor and whose wavelength is different from that of the excitation light passes through dichroic mirror 526 and is then folded by mirrors 502 and 501 to enter light tunnel 527.

Phosphor wheel 511 and phosphor wheel 521 are provided with a phosphor that emits the same color of fluorescence. That is, phosphor wheel 511 and phosphor wheel 521 emit fluorescence of the same color (for example, red, green, or yellow including a wavelength of red to green).

Phosphor wheels 511 and 521 need not be circular and may be polygonal, such as triangular or square. Further, Phosphor wheels 511 and 521 may be a rotating body that has a rotatable shape such as a block or other shape and that is not limited to the plate shape. The surface of the rotating body to which the excitation light is irradiated is a flat surface. In order to provide stable rotation, it is desirable that the rotating body be a circular plate. In addition, the phosphor may be disposed on a circle centered on the rotation axis of the phosphor wheel, the circle including the irradiation position of the excitation light. The shape of the phosphor does not have to be a circle centered on the rotation axis, and may be various shapes such as a triangle or a quadrangle (polygon). A phosphor may or may not be disposed on the regions other than the irradiation position of the excitation light.

The emitted light of light tunnel 527 irradiates display device 504 and the image light formed by display device 504 is projected by projection lens 505.

Video processing circuit 506 sends a video signal to display device 504, and outputs, to phosphor rotation controller 507, a driving periodic signal that indicates the driving cycle of display device 504.

Optical sensor 503 provided on the side surface of light tunnel 527 detects leaked light from the light tunnel 527 to output, to phosphor rotation controller 507, a light intensity detection signal that detects the intensity of light in light tunnel 527.

Phosphor wheels 511 and 521 are provided with indices 513 and 523, respectively. Optical sensors 514 and 524 serving as the index detecting mechanism detect the passage of the respective indices 513 and 523, and output the detection results to motor driving circuits 512 and 522.

Motor drive circuits 512 and 522 drive motors 515 and 525 to rotate phosphor wheels 511 and 521, respectively.

Mirrors 501 and 502, optical sensor 503, phosphor rotation controller 507, excitation light sources 510 and 520, phosphor wheels 511 and 521, motor drive circuits 512 and 522, optical sensors 514 and 524, motors 515 and 525, and dichroic mirrors 516 and 526 constitute light source device 500.

The configuration shown in FIG. 5 is for generating image light of a fluorescent color. However, in an actual projector, a plurality of light source devices 500 shown in FIG. 5 are used, or a plurality of all the configurations shown in FIG. 5 are used to form projected image light.

When a plurality of light source devices 500 are used, two light source devices 500 are used, and red and green fluorescence are generated in each light source device 500. The red fluorescence and the green fluorescence are combined with blue light obtained by a separately provided light source to generate white light, and projected image light is formed by using one or three display devices.

When all the configurations shown in FIG. 5 are used, two of the configurations shown in FIG. 5 are used to project and synthesize, on a display screen, red projection image light, green projection image light, and blue projection image light that is obtained by a light source separately provided.

Figure 6:
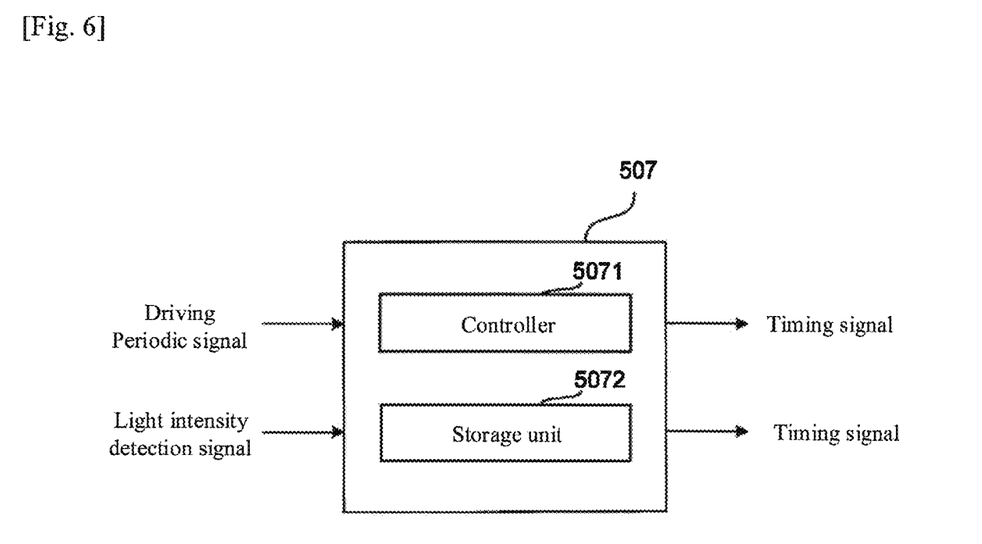
FIG. 6 is a block diagram showing a configuration of phosphor rotation controller 507.

FIG. 6 is a block diagram showing the configuration of phosphor rotation controller 507. The phosphor rotation controller includes controller 5071 and storage unit 5072. Storage unit 5072 stores control operations of controller 5071. Controller 5071 calculates, based on the driving periodic signal that indicates the driving cycle of display device 504 output from the video processing circuit 506, the rotation speed of phosphor wheels 511 and 521 at which the flicker is reduced with respect to the driving cycle of display device 504, and outputs, to motor drive circuits 512 and 522, a timing signal (pulse signal) that includes one pulse per cycle. Motor drive circuits 512 and 522 rotate phosphor wheels 511 and 521 via motors 515 and 525, respectively, so that the pulse included in the timing signal coincides with the detection timing at which indexes 513 and 523 are detected by optical sensors 514 and 524. Controller 5071 has a function in which the rotation timing signals to be output to motor drive circuits 512 and 522 are shifted by an arbitrary angle.

Next, a method of measuring the amount of light performed by controller 5071 in this example embodiment will be described with reference to FIG. 7.

In the first measurement, excitation light sources 510 and 520 shown in FIG. 5 are lit simultaneously, and phosphor wheels 511 and 521 are rotated at the same speed so that index 513 of phosphor wheel 511 and index 523 of phosphor wheel 521 appear simultaneously as shown in FIGS. 7(a) and (b).

Here, the difference between the maximum value and the minimum value per rotation of the amount of the combined light measured by optical sensor 503 shown in FIG. 5 is obtained and stored in storage unit 5072.

In the second measurement, as shown in FIGS. 7A and 7C, the rotation of phosphor wheels 511 and 521 is maintained at the same speed, and phosphor wheels 511 and 521 are rotated so that index 523 of phosphor wheel 521 is shifted by the amount of angle a with respect to index 513 of phosphor wheel 511. At this time, similarly to the first measurement, the difference between the maximum value and the minimum value per rotation of the amount of the combined light measured by optical sensor 503 shown in FIG. 5 is obtained and stored in storage unit 5072.

Figure 7:
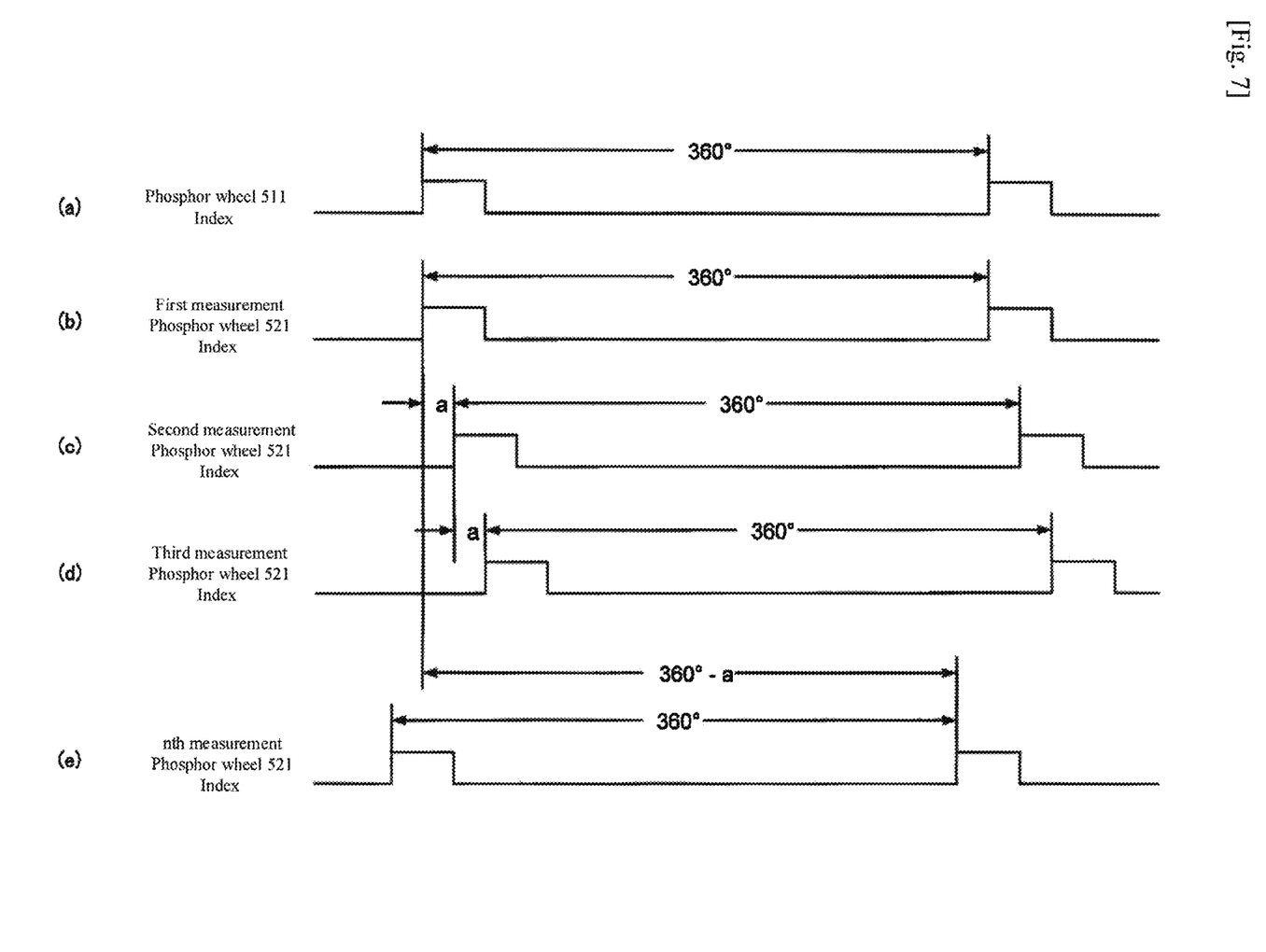

Thereafter, as in the third measurement (see FIG. 7 (d)) and the fourth measurement, while shifting index 523 of phosphor wheel 521 by the amount of angle a, the measurement is performed until the relationship between the index of phosphor wheel 511 and the index of phosphor wheel 521 becomes "360–a" as shown in FIGS. 7 (a), (e). For each measurement, the difference between the maximum value and the minimum value per rotation of the amount of the combined light measured by optical sensor 503 shown in FIG. 5 is obtained and stored in storage unit 5072.

With respect to the difference between the maximum value and the minimum value in each measurement stored as described above, the angle of phosphor wheel 521 at which the difference becomes the smallest is obtained. Thereafter, phosphor wheel 511 and phosphor wheel 521 are rotated so as to have the angular difference that has been obtained.

At this time, the smaller the shift angle per one time, the higher the accuracy. However, since the time required for measurement increases, the angle to be shifted is determined in accordance with the uniformity of coating.

This measurement may be performed at the time of production of the projector or at the time of initial start-up. However, when the phosphor wheel is replaced due to a decrease in the amount of light with the elapse of time or due to a failure, it is necessary to carry out measurement again.

In the present example embodiment, the configuration, in which indexes 513 and 523 are attached to back surfaces of phosphor wheels 511 and 521 so as to be read by optical sensors 514 and 524, is explained. However, the present invention is not limited to such a configuration. Any configuration may be used as long as the position serving as a reference of the phosphor wheel can be detected. The index may be provided at a position capable of detecting the same rotation as the phosphor wheel, and the position thereof is not limited to the back surface of the phosphor wheel. Other techniques, such as magnets and Hall elements, may also be used for the index and the sensor.

Further, in the present embodiment, as shown in FIG. 2, a phosphor wheel, in which a phosphor is coated in a ring shape, is used. However, the phosphor may be provided at a position where the excitation laser is irradiated when the phosphor wheel is rotated. For example, the phosphor may be provided in a polygonal shape or may be coated to the entire surface of the phosphor wheel.

In addition, the phosphor wheel is not limited to the construction in which the phosphor is coated. For example, a phosphor wheel, in which a ring-shaped phosphor is attached to a disk or in which a ring-shaped fragment is bonded on the disk, has the effect of reducing flicker by the present invention.

Figure 8:
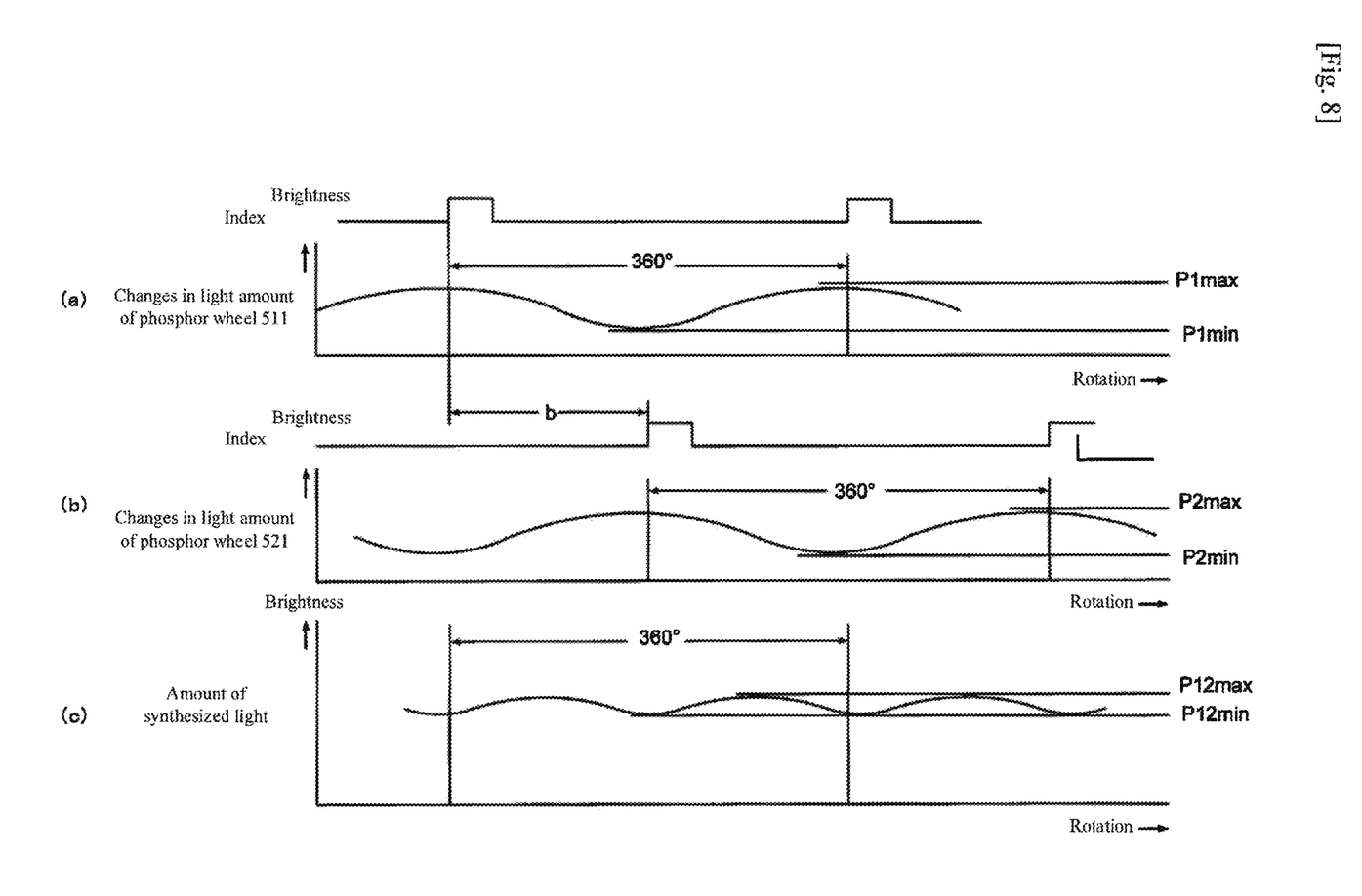

The effect of the present embodiment will be described with reference to FIG. 8.

FIG. 8(a) shows a change in the amount of light of phosphor wheel 511, FIG. 8(b) shows a change in the amount of light of phosphor wheel 512, and FIG. 8(c) shows a change in the amount of light of the combined light.

The maximum and minimum values of phosphor wheel 511 are P1max and P1min, and the maximum and minimum values of phosphor wheel 512 are P2max and P2min. It is shown that when the angular deviation between the indexes of phosphor wheels 511 and 512 is b, the difference between maximum value P12max and minimum value P12min of the combined light quantity is the smallest. As shown in each drawing of FIG. 8, the change in the amount of light during one rotation is small compared to the case where one phosphor wheel is provided.

Thus, by rotating the two phosphor wheels by an appropriate angle shift so that the difference between the maximum value and the minimum value of the combined light during one rotation of the two phosphor wheels becomes the smallest, the fluctuation of the light quantity is reduced, and the effect of reducing the amount of flicker is obtained.

As described above, the case where the unevenness of the two phosphor wheels has the same characteristic has been described, as an example. Next, a case where the unevenness of the two phosphor wheels has different characteristics will be described with reference to FIG. 9.

Figure 9:
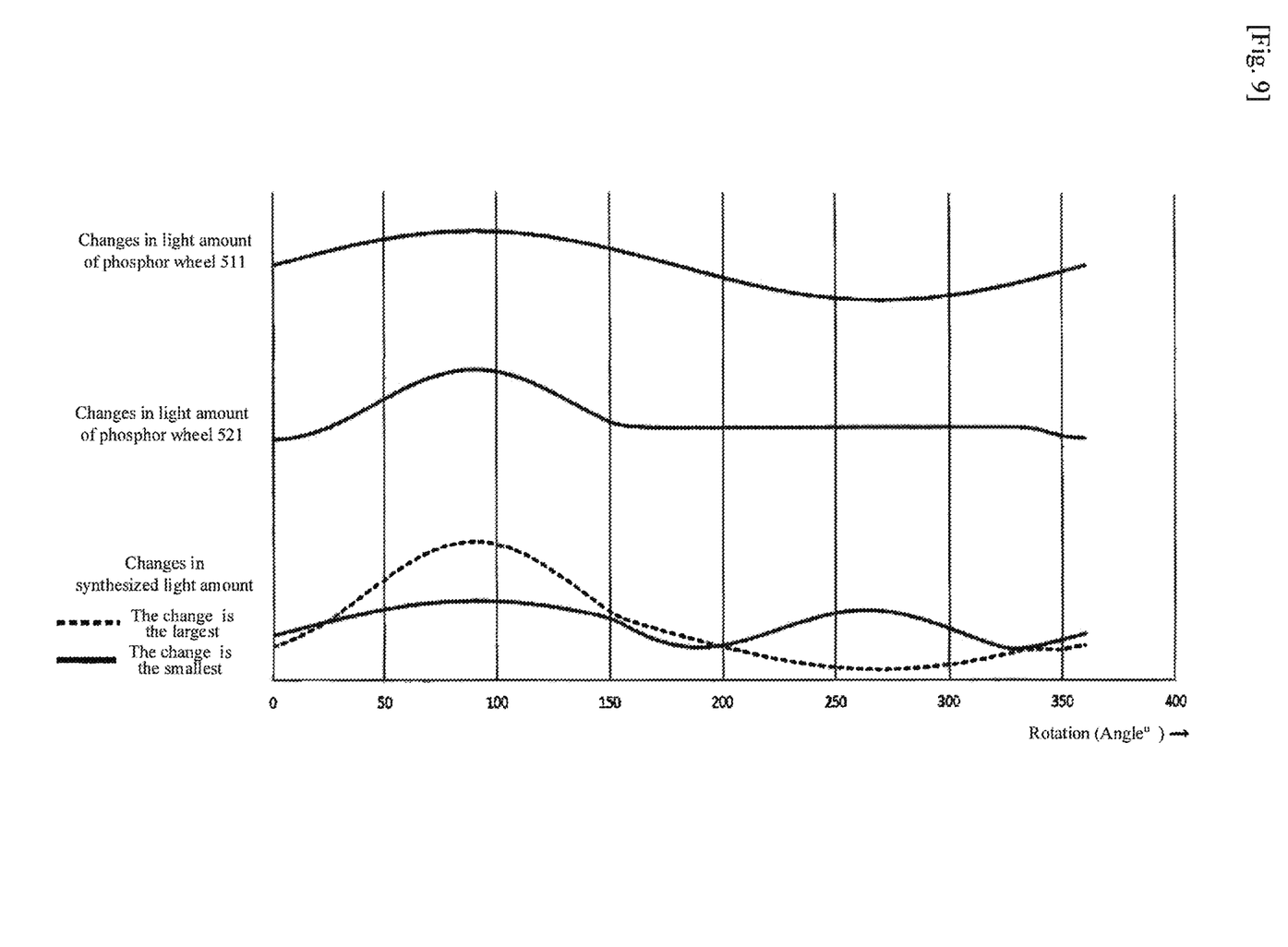
FIG. 9 is a graph showing, with respect to two phosphor wheels 511 and 521, changes in the amount of light of each phosphor wheel and changes in the amount of light at the angles of the two phosphor wheels in both a case where the change in the amount of light after synthesis is the largest and a case where the change in the amount of light after synthesis is the smallest.

FIG. 9 is a graph showing, with respect to two phosphor wheels 511 and 521, changes in the amount of light of each phosphor wheel and changes in the amount of light at the angles of the two phosphor wheels in both a case where the change in the amount of light after synthesis is the largest and a case where the change in the amount of light after synthesis is the smallest.

From the graph indicating changes in the amount of light after the synthesis in FIG. 9, it is understood that an improvement can be obtained by combining phosphor wheels in which changes in the amount of light differ.

Example Embodiment 2

Next, a second example embodiment of the present invention will be described. The configuration of this example embodiment is the same as that of the first example embodiment shown in FIG. 5, etc., but the measurement method is different from the first example embodiment.

In the present example embodiment, in a state in which excitation light source 510 is turned on and excitation light source 520 is turned off, a change in the amount of light during one rotation of phosphor wheel 511 is measured by optical sensor 503 and stored in storage unit 5072. Next, in a state in which excitation light source 510 is turned off and excitation light source 520 is turned on, a change in the amount of light during one rotation of phosphor wheel 521 is measured by optical sensor 503, and stored in storage unit 5072.

Controller 5071 adds the amount of light for one rotation of phosphor wheel 512 to the stored amount of light for one rotation of phosphor wheel 511, and obtains the difference between the maximum value and the minimum value. This process is repeatedly performed while changing the angle difference between phosphor wheel 511 and phosphor wheel 521 by a predetermined amount (for example, the angle a), and the angle at which the difference between the maximum value and the minimum value becomes the smallest is determined. In the present example embodiment, the actual measurement is for two revolutions, and the rest is performed only by calculation. Therefore, the optimum angle can be obtained in a short time as compared with the first example embodiment in which the actual measurement is repeatedly performed.

Example Embodiment 3

Next, a third example embodiment according to the present invention will be described.

From among the configurations shown in FIG. 5, the configuration for generating fluorescence by phosphor wheel 511 that comprise excitation light source 510, phosphor wheel 511, motor drive circuit 512, motor 515, index 513, optical sensor 514, and dichroic mirror 516 is the same as the configuration for generating fluorescence by phosphor wheel 521 that comprises excitation light source 520, phosphor wheel 521, motor drive circuit 522, motor 525, index 523, optical sensor 524, and dichroic mirror 526. In the present example embodiment, two sets of light source modules are configured to generate each fluorescence, and only the light source module measures changes in the amount of light separately from the projector main body. After the light source module is mounted on the projector body, the optimum angular difference between the phosphor wheels is obtained by calculation in the same manner as the second example embodiment to drive the phosphor wheels.

Figure 10:
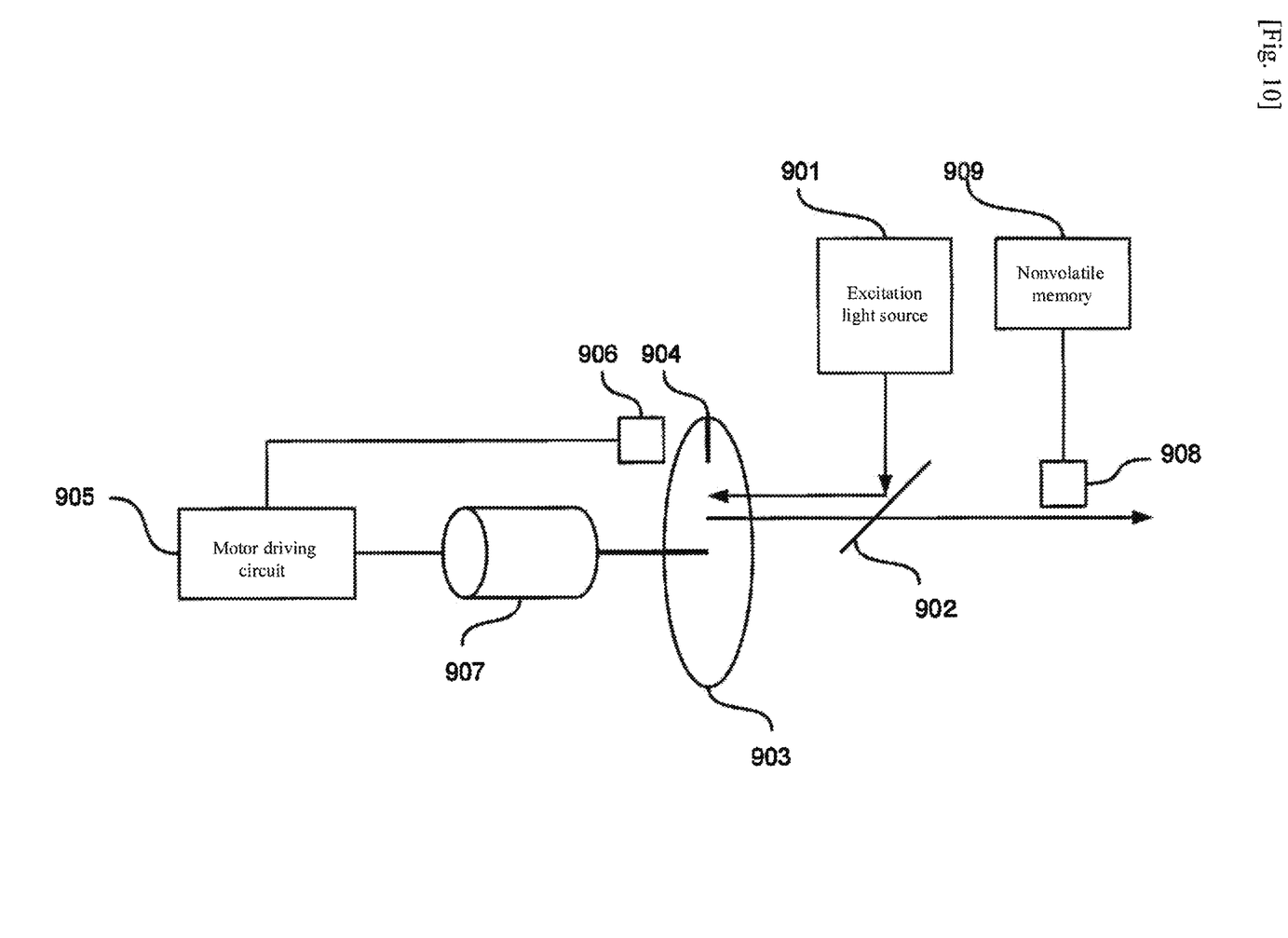
FIG. 10 is a block diagram showing the configuration of a light source module used in a second example embodiment of the present invention.
Figure 11:
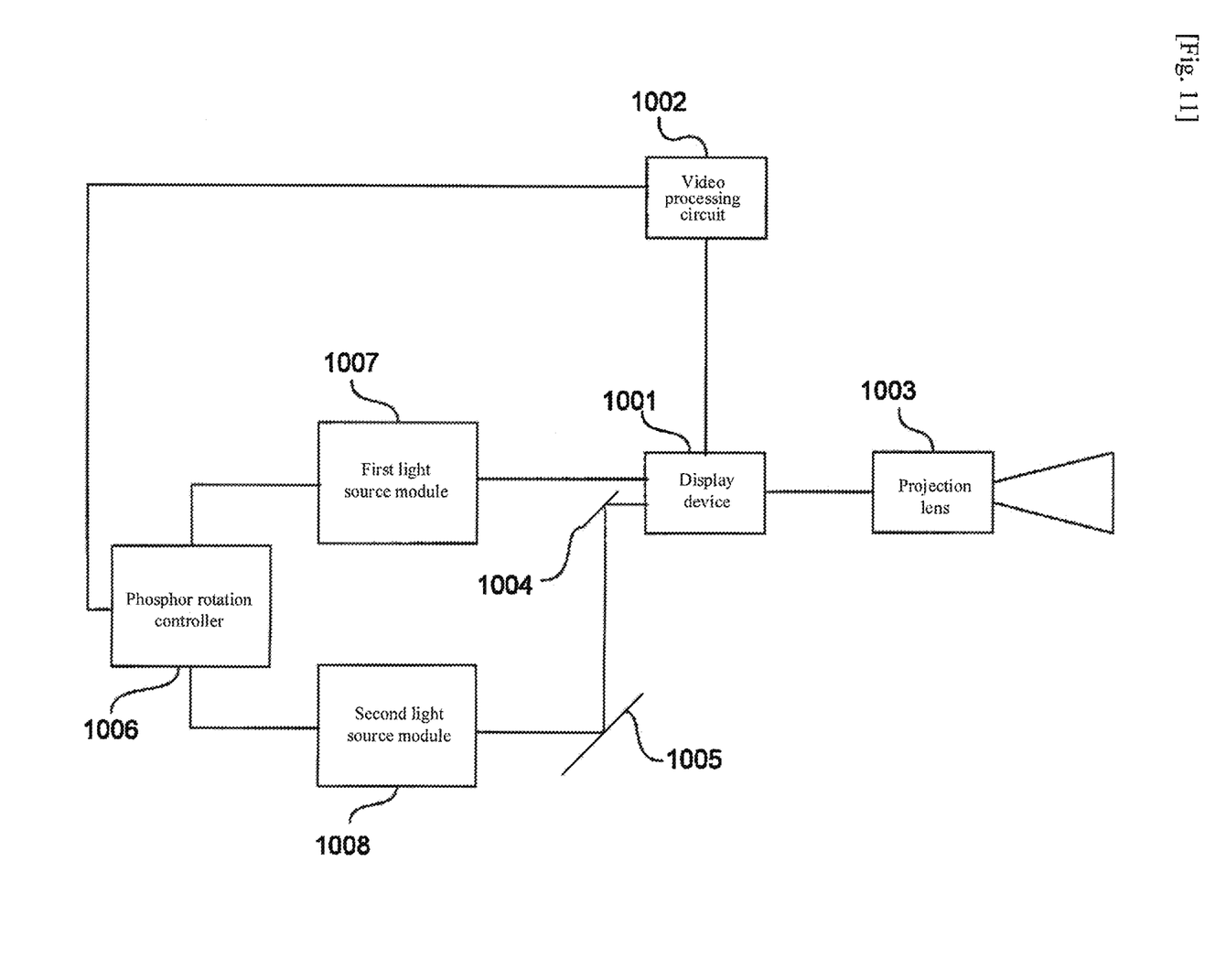
FIG. 11 is a block diagram showing a configuration of a projector on which two light source modules shown in FIG. 10 are mounted.

FIG. 10 is a block diagram showing a configuration of a light source module used in the present example embodiment, and FIG. 11 is a block diagram showing a configuration of a projector in which the two light source modules shown in FIG. 10 are mounted.

In the light source module shown in FIG. 10, the configuration that comprises excitation light source 901, phosphor wheel 903, motor driving circuit 905, motor 907, index 904, optical sensor 906, and dichroic mirror 902 is the same as the configuration that comprises excitation light source 510, phosphor wheel 511, motor driving circuit 512, motor 515, index 513, optical sensor 514, and dichroic mirror 516 shown in FIG. 5.

As a configuration peculiar to the present example embodiment, light sensor 908 that measures the amount of fluorescence and nonvolatile memory 909 that stores changes in the amount of light during one rotation of phosphor wheel 903 are provided.

In the present example embodiment, in a state in which the light source module shown in FIG. 10 is not mounted on the projector main body, changes in the amount of fluorescence are measured by optical sensor 908, and the measurement result is stored in 1006 909.

Next, the two light source modules shown in FIG. 10 are incorporated in the projector to be in the state shown in FIG. 11.

First light source module 1007 and second light source module 1008 in FIG. 11 include the configuration shown in FIG. 10. Display device 1001, video processing circuit 1002, projection lens 1003, mirrors 1004 and 1005, and phosphor rotation controller 1006 are configured in the same manner as display device 504, video processing circuit 506, projection lens 505, mirrors 501 and 502, and phosphor rotation controller 507 shown in FIG. 5.

However, in the present example embodiment, phosphor rotation controller 1006 is configured to be able to read the stored contents of the nonvolatile memories (each corresponding to nonvolatile memory 909 shown in FIG. 10) that are provided in first light source module 1007 and second light source module 1008.

When first light source module 1007 and second light source module 1008 are attached to the projector main body, phosphor rotation controller 1006 adds, based on the information of the changes of the fluorescence amount stored in nonvolatile memory 909 of each light source module, one item of data regarding the amount of light to another item of data regarding change in the amount of light while shifting one item of data regarding change in the amount of light without actually lighting, as in the second embodiment, and then phosphor rotation controller 1006 obtains the difference between the maximum value and the minimum value to determine the angle at which the difference becomes the smallest.

In the present example embodiment configured as described above, even when the light source module is replaced due to, for example, a decrease in the amount of light with the elapse of time or a failure, lighting can be performed in a state in which flicker is reduced without performing measurement, and time required for replacement can be shortened.

In the present example embodiment, an example is described in which the light source module itself shown in FIG. 10 is provided with optical sensor 908 to measure the amount of fluorescence, but the optical sensor used for the measurement may be installed outside the light source module to perform the measurement.

In the example embodiment, the first phosphor wheel and the second phosphor wheel are rotated so that the difference between the maximum value and the minimum value of the combined light of the first fluorescence obtained by the first phosphor wheel and the second fluorescence obtained by the second phosphor wheel becomes the smallest. However, the present invention is not limited to such a configuration. For example, if the difference between the maximum value and the minimum value of the combined light of the first fluorescence and the second fluorescence is D and if the maximum value of D is $D_{max}$, the first phosphor wheel and the second phosphor wheel may be rotated so that D is smaller than $D_{max}$. By making D smaller than $D_{max}$, flicker in a projector using a plurality of phosphor wheels can be reduced as compared with the case of $D_{max}$.

EXPLANATION OF REFERENCE NUMBERS

500 Light source device
501,502 Mirror
503 Optical sensor
504 Display device
505 Projection lens
506 Video processing circuit
507 Phosphor rotation controller
510,520 Excitation light source
511,521 Phosphor wheel
512,522 Motor drive circuit
513,523 Index
514,524 Optical sensor
515,525 Motor
516,526 Dichroic mirror
527 Light tunnel

The invention claimed is:

1. A light source device comprising:
a first rotating body and a second rotating body that each include a phosphor; and
a rotation body controller that rotates the first rotating body and the second rotating body so that a difference between a maximum value and a minimum value of synthesized light of a first fluorescence obtained by the first rotating body and a second fluorescence obtained by the second rotating body becomes smaller.

2. The light source device according to claim 1, further comprising:
a first index and a second index that are provided on the first rotating body and the second rotating body;
a first index detecting section and a second index detecting section that detect the first index and the second index; and
a sensor that detects an amount of the combined light,
wherein the rotation body controller includes:
a storage unit; and
a controller that executes a process, in which a detection result obtained by the sensor is stored in the storage unit when the first rotating body and the second rotating body are rotated by one rotation, a plurality of times in a state in which detection timings of the first index and the second index detected by the first index detecting unit and the second index detecting unit are different from each other; and thereafter rotates the first phosphor wheel and the second phosphor wheel, from among the detection results stored in the storage unit, at detection timings of the first index and the second index at which a difference between a maximum value and a minimum value of synthesized light becomes smaller.

3. The light source device according to claim 1, further comprising:
a first excitation light source and a second excitation light source that excite the phosphors of the first rotating body and the second rotating body to generate the first fluorescence and the second fluorescence;
a first index and a second index that are provided on the first rotating body and the second rotating body;
a first index detecting section and a second index detecting section that detect the first index and the second index; and
a sensor that detects an amount of combined light,
wherein the rotation body controller includes:
a storage unit; and
a controller that causes the storage unit to store a detection result by the sensor for one rotation when fluorescence is generated only in the phosphor of the first rotating body by the first excitation light source and a detection result by the sensor for one rotation when fluorescence is generated only in the phosphor of the second rotating body by the second excitation light source; and thereafter, determines, from among the detection results stored in the storage unit, detection timings of the first index and the second index, at which a difference between a maximum value and a minimum value of synthesized light becomes smaller, to rotate the first rotating body and the second rotating body at the determined timings.

4. The light source device according to claim 1, wherein the first rotating body or the second rotating body comprises a first light source module or a second light source module that can be incorporated in a projector together with:
a first index or a second index provided on the first rotating body or the second rotating body;
a first index detector or a second index detector for detecting the first index or the second index;
a first sensor or a second sensor for detecting the amount of fluorescence generated by the first rotating body or the second rotating body; and
a first memory or a second memory that stores detection results obtained by the first sensor or the second sensor when the first rotating body or the second rotating body is rotated by one rotation,
wherein the rotation body controller includes:
a storage unit; and
a controller that reads out a storage content of the first memory and the second memory to cause the storage unit to store the storage content; and thereafter, determines, from among the detection results stored in the storage unit, detection timings of the first index and the second index, at which a difference between a maximum value and a minimum value of synthesized light becomes smaller, to rotate the first rotating body and the second rotating body at the determined timings.

5. A projector comprising:
the light source device according to claim 1;
a display device that modulates light emitted from the light source device based on a video signal; and
a projection lens that projects light modulated by using the display device.

6. A method of controlling rotation of a first rotating body and a second rotating body that each include a phosphor, the method comprising rotating the first rotating body and the second rotating body so that a difference between a maximum value and a minimum value of synthesized light of first fluorescence obtained by the first rotating body and second fluorescence obtained by the second rotating body becomes smaller.

7. A projector comprising:
   a plurality of light source modules, wherein each module includes:
      a phosphor wheel;
      an index provided on the phosphor wheel;
      an index detecting unit that detects the index;
      a sensor that detects an amount of fluorescent light generated by the phosphor wheel; and
      a memory that stores detection results obtained by the sensor when the phosphor wheel is rotated by one rotation;
   a display device that modulates light emitted from the plurality of light source modules based on a video signal;
   a projection lens that projects light modulated by using the display device; and
   a rotation controller configured to be able to read the detection results stored in the memory of each of the plurality of light source modules,
   wherein the rotation controller rotates, based on the detection results stored in the memory, the phosphor wheel of each of the plurality of light source modules so that a change in the amount of the light emitted from the plurality of light source modules is reduced when the phosphor wheel is rotated by one rotation.

8. The projector according to claim 7,
   wherein the memory stores a change in the amount of florescent light emitted from the plurality of light source modules detected during one rotation of the phosphor wheel, and
   wherein the rotation controller adds, based on the detection results stored in the memory of each of the plurality of light source modules, the amount of light detected during one rotation of the phosphor wheel of each of the plurality of light source modules, and obtains the difference between the maximum value and the minimum value of florescent light generated by the phosphor wheel of each of the plurality of light source modules.

9. The projector according to claim 8,
   wherein the rotation controller rotates, based on the detection results stored in the memory, the phosphor wheel of each of the plurality of light source modules so that the difference between a maximum value and a minimum value of the combined amount of fluorescent light generated by the phosphor wheel, in each of the plurality of light source modules, becomes smaller.

* * * * *